(12) United States Patent
Burgess et al.

(10) Patent No.: US 11,185,766 B2
(45) Date of Patent: *Nov. 30, 2021

(54) GAMES CONTROLLER

(71) Applicant: Ironburg Inventions Limited, Wincanton (GB)

(72) Inventors: Simon Burgess, Cossington (GB); Duncan Ironmonger, Atlanta, GA (US)

(73) Assignee: Ironburg Inventions Limited, Wincanton (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/815,158

(22) Filed: Mar. 11, 2020

(65) Prior Publication Data

US 2020/0206608 A1    Jul. 2, 2020

Related U.S. Application Data

(60) Continuation of application No. 16/237,879, filed on Jan. 2, 2019, now Pat. No. 10,596,455, which is a division of application No. 15/040,000, filed as application No. PCT/EP2014/075861 on Nov. 27, 2014, now Pat. No. 10,188,940.

(60) Provisional application No. 61/910,260, filed on Nov. 29, 2013.

(51) Int. Cl.
*A63F 13/24* (2014.01)
*A63F 13/22* (2014.01)

(52) U.S. Cl.
CPC .............. *A63F 13/24* (2014.09); *A63F 13/22* (2014.09); *A63F 2300/1018* (2013.01); *A63F 2300/1043* (2013.01)

(58) Field of Classification Search
CPC .......... A63F 13/20; A63F 13/22; A63F 13/23; A63F 13/235; A63F 13/24; A63F 13/40; A63F 13/387; A63F 13/92; A63F 13/98
See application file for complete search history.

(56) References Cited

U.S. PATENT DOCUMENTS

| 4,032,728 A | 6/1977 | Oelsch |
| 5,430,262 A | 7/1995 | Matsui et al. |
| 5,451,053 A | 9/1995 | Garrido |
| 5,773,769 A | 6/1998 | Raymond |

(Continued)

FOREIGN PATENT DOCUMENTS

| CN | 202528096 | 11/2012 |
| CN | 203077157 | 7/2013 |

(Continued)

OTHER PUBLICATIONS

Burns, "Review: Scuf Xbox 360 Controller," Xboxer360.com (2010).

(Continued)

*Primary Examiner* — Omkar A Deodhar
(74) *Attorney, Agent, or Firm* — Walters & Wasylyna LLC

(57) ABSTRACT

A game controller for controlling electronic games comprising a controller chassis and an actuator system including: an actuator body pivotally mounted to the controller chassis; a strike plate coupled to the actuator body; a trigger adjustment system having an arm; and an actuator adjustment control screw received in a screw thread disposed within said arm. A portion of the actuator adjustment control screw may engage with a portion of the strike plate and said portion of the actuator adjustment control screw creates an end stop to limit movement of the actuator body.

20 Claims, 12 Drawing Sheets

(56) References Cited

U.S. PATENT DOCUMENTS

| | | | |
|---|---|---|---|
| 5,841,372 A | 11/1998 | Matsumoto | |
| 5,874,906 A | 2/1999 | Willner et al. | |
| 5,989,123 A | 11/1999 | Tosaki et al. | |
| 6,203,432 B1 | 3/2001 | Roberts et al. | |
| 6,251,015 B1 | 6/2001 | Caprai | |
| 6,512,511 B2 | 1/2003 | Willner et al. | |
| 6,752,719 B2 | 6/2004 | Himoto et al. | |
| 6,760,013 B2 | 7/2004 | Willner et al. | |
| 7,510,477 B2 | 3/2009 | Argentar | |
| 7,758,424 B2 | 7/2010 | Riggs et al. | |
| 7,859,514 B1 | 12/2010 | Park | |
| 8,641,525 B2 | 2/2014 | Burgess et al. | |
| 8,777,620 B1 | 7/2014 | Baxter | |
| 9,089,770 B2 | 7/2015 | Burgess et al. | |
| 9,804,691 B1 | 10/2017 | Strahle et al. | |
| 2001/0003713 A1 | 6/2001 | Willner et al. | |
| 2001/0025778 A1 | 10/2001 | Ono | |
| 2002/0052237 A1 | 5/2002 | Magill | |
| 2002/0128064 A1 | 9/2002 | Sobota | |
| 2003/0067111 A1 | 4/2003 | Swan | |
| 2004/0259059 A1 | 12/2004 | Aoki | |
| 2005/0083297 A1 | 4/2005 | Duncan | |
| 2005/0255915 A1 | 11/2005 | Riggs et al. | |
| 2005/0255918 A1 | 11/2005 | Riggs et al. | |
| 2006/0025217 A1 | 2/2006 | Hussaini et al. | |
| 2006/0116204 A1 | 6/2006 | Chen et al. | |
| 2008/0261695 A1 | 10/2008 | Coe | |
| 2009/0088250 A1 | 4/2009 | Carlson | |
| 2009/0258705 A1 | 10/2009 | Guinchard | |
| 2010/0073283 A1 | 3/2010 | Enright | |
| 2010/0267454 A1 | 10/2010 | Navid | |
| 2010/0304865 A1 | 12/2010 | Picunko | |
| 2011/0256930 A1 | 10/2011 | Jaouen | |
| 2011/0281649 A1 | 11/2011 | Jaouen | |
| 2012/0088582 A1 | 4/2012 | Wu et al. | |
| 2012/0142418 A1 | 6/2012 | Muramatsu | |
| 2012/0142419 A1 | 6/2012 | Muramatsu | |
| 2012/0299244 A1 | 11/2012 | Rice et al. | |
| 2012/0322553 A1 | 12/2012 | Burgess et al. | |
| 2012/0322555 A1 | 12/2012 | Burgess et al. | |
| 2013/0147610 A1 | 6/2013 | Grant et al. | |
| 2013/0150155 A1 | 6/2013 | Barney et al. | |
| 2013/0196770 A1 | 8/2013 | Barney et al. | |
| 2014/0274397 A1 | 9/2014 | Sebastian | |
| 2015/0234479 A1 | 8/2015 | Schantz et al. | |
| 2015/0238855 A1 | 8/2015 | Uy et al. | |
| 2016/0082349 A1 | 3/2016 | Burgess et al. | |
| 2016/0193529 A1 | 7/2016 | Burgess et al. | |
| 2016/0346682 A1 | 12/2016 | Burgess et al. | |
| 2017/0001107 A1 | 1/2017 | Burgess et al. | |
| 2017/0001108 A1 | 1/2017 | Burgess et al. | |
| 2017/0087456 A1 | 3/2017 | Burgess et al. | |
| 2017/0151494 A1 | 6/2017 | Ironmonger et al. | |
| 2017/0157509 A1 | 6/2017 | Burgess et al. | |

FOREIGN PATENT DOCUMENTS

| | | |
|---|---|---|
| DE | 202006003 631 | 8/2007 |
| EP | 1078660 | 2/2001 |
| EP | 1140303 | 10/2001 |
| EP | 1 208 883 | 5/2002 |
| EP | 1852162 | 11/2007 |
| EP | 2440438 | 4/2012 |
| EP | 2 479 636 | 7/2012 |
| EP | 2 698 185 | 2/2015 |
| EP | 2 908 224 | 8/2015 |
| GB | 2 204 387 | 11/1988 |
| GB | 2 244 546 | 12/1991 |
| GB | 2 481 633 | 1/2012 |
| JP | H1020951 | 1/1998 |
| JP | 2001-84077 | 3/2001 |
| WO | WO 02/34345 | 5/2002 |
| WO | WO 03/046822 | 6/2003 |
| WO | WO 2005/103869 | 11/2005 |
| WO | WO 2007/040499 | 4/2007 |
| WO | WO 2008/131249 | 10/2008 |
| WO | WO 2012/036710 | 3/2012 |
| WO | WO 2014/187923 | 11/2014 |
| WO | WO 2015/004261 | 1/2015 |
| WO | WO 2015/078990 | 6/2015 |
| WO | WO 2015/110553 | 7/2015 |
| WO | WO 2015/173269 | 11/2015 |

OTHER PUBLICATIONS

"Rapid Fire Mod for Wireless Xbox 360 Controller," forum on xbox-scene.com, (2008).

"Thrustmaster USB game controller roundup," dansdata.com/tmsticks.htm (2002).

Coles, Olin, "Thrustmaster Run-N-Drive PC/PS3 Wireless Gamepad" BenchmarkReviews.com (2009).

Xbox 360 Wireless Controller Tour, published on May 13, 2005 at http://www.ign.com/articles/2005/05/13/xbox-360-wireless-controller-tour.

Sean Buckley: "Mad Catz MLG Pro Circuit controller review (PS3)," https://www.engadget.com/2012/01/29/mad-catz-mlg-pro-circuit-controller-review-ps3/ (Jan. 29, 2012).

Joe Robinson: "Mad Catz MLG Pro Circuit Controller Review," GameWatcher, Editorials, https: www.gamewatcher.co/editorials/mad-catz-mlg-pro-circuit-controller-review/11890# (Apr. 18, 2012).

Driph.com/words: "Mad Catz MLG Pro Circuit Controller review & comparison," https://driph.com/words/2012/01/mad-catz-mlg-pro-circuit-controller-review-comparison/ (Jan. 20, 2012).

Wikipedia: "Nintendo 64 accessories," https://en.wikipedia.org/w/index.php?title=Nintendo_64_accessories+oldid=784405317.

Wikipedia: "Rumble Pak," https://en.wikipedia.org/w/index.php?title=Rumble_Pak+oldid=768546573.

Nick Statt: "Scuf's new PS4 Controller adds wireless play and new customizable side buttons," The Verge, circuit breaker, https://www.theverge.com/circuitbreaker/2018/5/22/17378730/scuf-gaming-vantage-ps4-pro-controller-wireless-sax-buttons-customizable (May 22, 2018).

Wikipedia: "List of Nintendo DS accessories," https://en.wikipedia.org/w/index.php?title=List_of_Nintendo_DS_accessories+oldid=768095407.

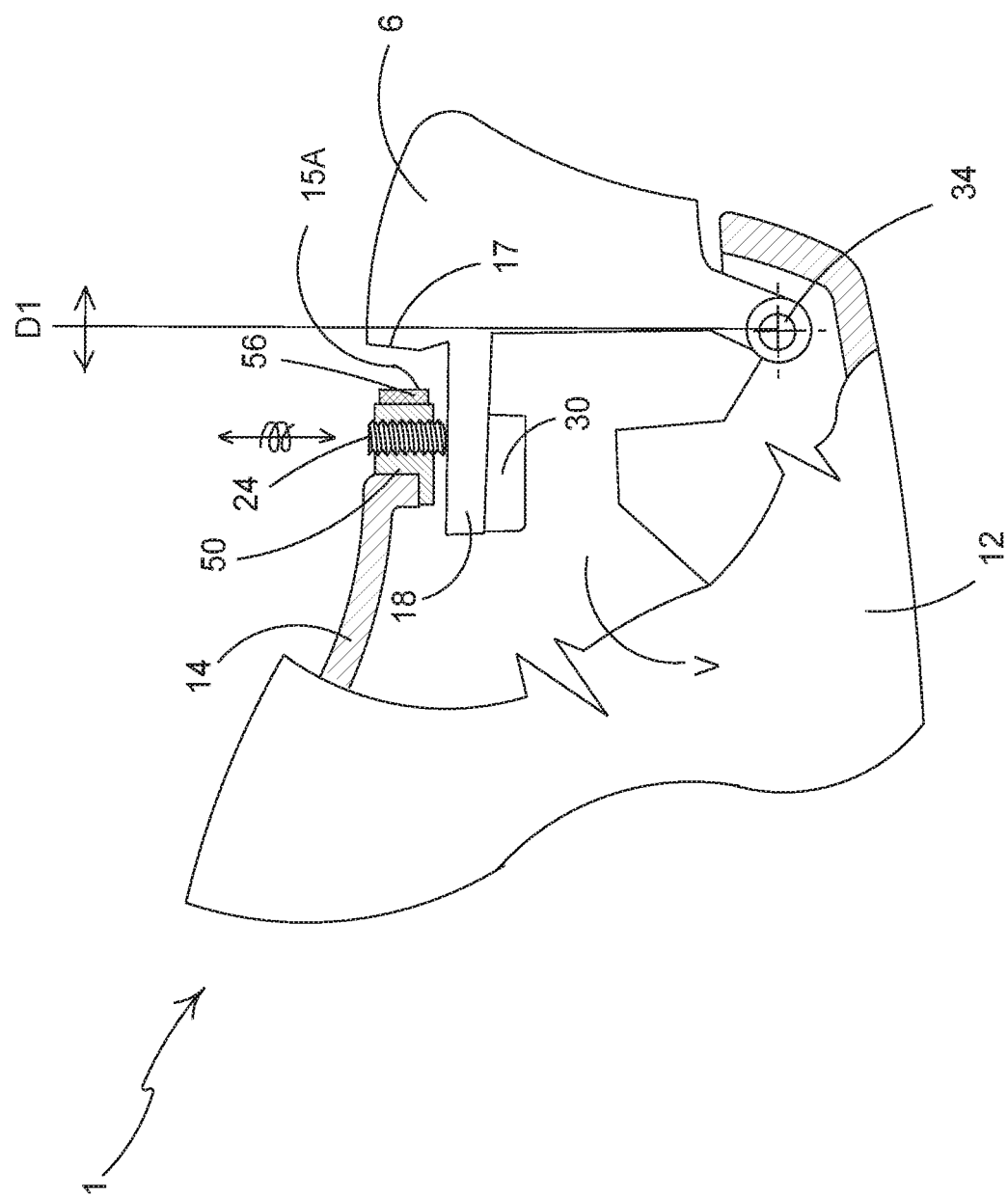

GAMES CONTROLLER

This application is a continuation of U.S. Ser. No. 16/237,879 filed on Jan. 2, 2019, which is a divisional of U.S. Ser. No. 15/040,000 filed on May 27, 2016, which is a U.S. national phase application of Intl. App. No. PCT/EP2014/075861 filed on Nov. 27, 2014, which claims priority from U.S. Ser. No. 61/910,260 filed on Nov. 29, 2013. The entire contents of U.S. Ser. No. 16/237,879, U.S. Ser. No. 15/040,000, Intl. App. No. PCT/EP2014/075861 and U.S. Ser. No. 61/910,260 are incorporated herein by reference.

TECHNICAL FIELD

The invention relates to controllers for controlling the play of computerised games. More particularly, but not exclusively, the invention relates to an actuator system of a game controller for a gaming console.

BACKGROUND

There are many different types of gaming consoles currently available for operating a video game. For example, Microsoft®, Sony® and Nintendo® manufacture the Xbox®, Playstation® and Wii® gaming consoles respectively. The gaming consoles typically include a game controller so that a user can control the operation of the video game.

Some known game controllers include a form of actuator system for the operation of control of the functions of the video games. Actuators, buttons or other depressible or manually operable devices are typically used for controlling discrete actions such as the firing of a weapon or an attack command. It is known to provide a button or actuator which is intended to be operable by the index finger of a user; such buttons are commonly known as triggers.

At times, dependent upon the video game being played, it can be necessary to depress the trigger a distance before the trigger initiation point is reached and the command actually acknowledged. This renders part of the depressing action futile. Likewise, after the command has been operated, it is often possible to carry out further depression of the trigger past the trigger initiation point. This further depression is unnecessary and may also be disadvantageous.

Furthermore, in other situations in some video games, the strength of a command is increased or decreased in dependence upon how frequently the trigger is depressed. As such, depressing the trigger the whole distance is unnecessary and excessive for the command or operation required.

It is desirable to have a controller, particularly for gaming applications, that is more responsive or has less scope for allowing unnecessary over-movement by the user of the controller. Due to the rapidly expanding gaming market and development of involved games invoking considerable player input, it is desirable for players to be able to customise their controllers in order to gain increased control in a variety of gaming circumstances.

The present invention seeks to improve upon or at least mitigate some of the problems associated with controllers of the prior art by providing a game controller which includes an adjustable trigger system that has a mechanism to allow the end user to control or recalibrate the maximum and/or minimum trigger positions.

SUMMARY

There are a variety of different commands available for the trigger functions of a game controller and the adjustable trigger system of the present invention now provides the option to customise the trigger settings in order to suit the individual game at the time of operation.

In some embodiments the trigger system includes adjustments to the depressible range of the trigger so that effectively the trigger is already, to some degree, "depressed", before any contact is actually made with the trigger by the operator (player).

In some embodiments the trigger system includes adjustments to the extent that the trigger is depressible such that no further motion can be effected by the operator. This removes any unnecessary distance travelled by the trigger.

The present invention provides a method of controlling both of the above features simultaneously regarding the amount of depression inflicted on the trigger without contact, and the range of available motion to give the optimum performance in any gaming circumstances.

According to an aspect of the invention there is provided an apparatus for supplying user inputs to a computer program, such as a game program, for controlling the game program, the apparatus comprising an outer case, at least one depressible trigger mechanism and having a mechanism for manual adjustment of the range motion of the trigger mechanism, the mechanism being disposed within an internal volume defined by an outer case of the apparatus.

According to another aspect of the invention there is provided an apparatus for supplying user inputs to a computer program, such as a game program, for controlling the game program, the apparatus comprising at least one depressible trigger mechanism and having a first mechanism for adjustment of the stop position of the trigger mechanism.

Optionally, the apparatus comprises a second mechanism for manual adjustment of the stop position of the trigger mechanism.

According to a further aspect of the invention there is provided a game controller for controlling electronic games, including a housing, at least one depressible trigger at least in part exposed relative to the housing, said at least one depressible trigger being in operational association with electrical circuitry contained within the housing which electrical circuitry is controlled by depression of the or each depressible trigger for manipulating electrical outputs of the circuitry for controlling electronic games and having a mechanism for manual adjustment of the depressible range of the trigger mechanism.

According to yet another aspect of the invention there is provided a game controller for controlling electronic games comprising:
  a controller chassis and an actuator system including:
    an actuator body pivotally mounted to the controller chassis;
    a strike plate coupled to the actuator body;
    a trigger adjustment system having an arm;
    an actuator adjustment control screw received in a screw thread disposed within said arm;
  wherein a portion of the actuator adjustment control screw engages with a portion of the strike plate and said portion of the actuator adjustment control screw creates an end stop to limit the actuator movement.

Optionally, a portion of said arm forms a second end stop to limit the actuator movement.

Optionally, the game controller comprises an outer case defining a void and wherein the trigger adjustment system is mounted within the void.

In some embodiments, the game controller comprises a removable cover panel for accessing and adjusting the trigger adjustment system.

In some embodiments, the game controller comprises an aperture in the outer case for receiving an adjustment tool for adjusting the trigger adjustment system.

Optionally, the actuator system is a trigger button.

According to a still further aspect of the invention there is provided an actuator adjustment system for adjusting the range of travel of an actuator in a game controller comprising:
- a base plate for mounting the actuator adjustment system to a controller body;
- a riser coupled to the base plate;
- an arm extending from the riser;
- wherein the arm comprises a screw thread for receiving an actuator adjustment control screw for adjusting the range of travel of the actuator and a strike plate for arresting motion of the actuator.

According to a still yet another aspect of the invention there is provided a method of adjusting the range of movement of a button on a game controller for controlling electronic games comprising:
- providing a game controller including:
  - a controller chassis:
    - a trigger body pivotally mounted to the controller chassis;
    - a strike plate coupled to the actuator body;
    - a trigger adjustment system having an arm;
    - an actuator adjustment control screw received in a screw thread disposed within said arm; wherein a portion of the trigger adjustment control screw engages with a portion of the strike plate and said portion of the actuator adjustment control screw creates an end stop to limit the actuator movement;
  - rotating said trigger adjustment control screw to adjust the position of the end stop.

Optionally, the game controller includes a removable cover panel, and the method comprises:
- removing the removable cover panel to gain access to the trigger adjustment control screw.

Within the scope of this application it is envisaged and intended that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF THE DRAWINGS

Exemplary embodiments of the invention will now be described with reference to the accompanying drawings, in which:

FIG. 10 is a cross sectional view of the trigger mechanism of FIG. 5 including the mechanism for adjusting trigger travel motion wherein the trigger body is illustrated in a first position:

DETAILED DESCRIPTION

Detailed descriptions of specific embodiments of the games controller and its trigger mechanisms are disclosed herein. It will be understood that the disclosed embodiments are merely examples of the way in which certain aspects of the invention can be implemented and do not represent an exhaustive list of all of the ways the invention may be embodied. Indeed, it will be understood that the games controller and its trigger mechanisms described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
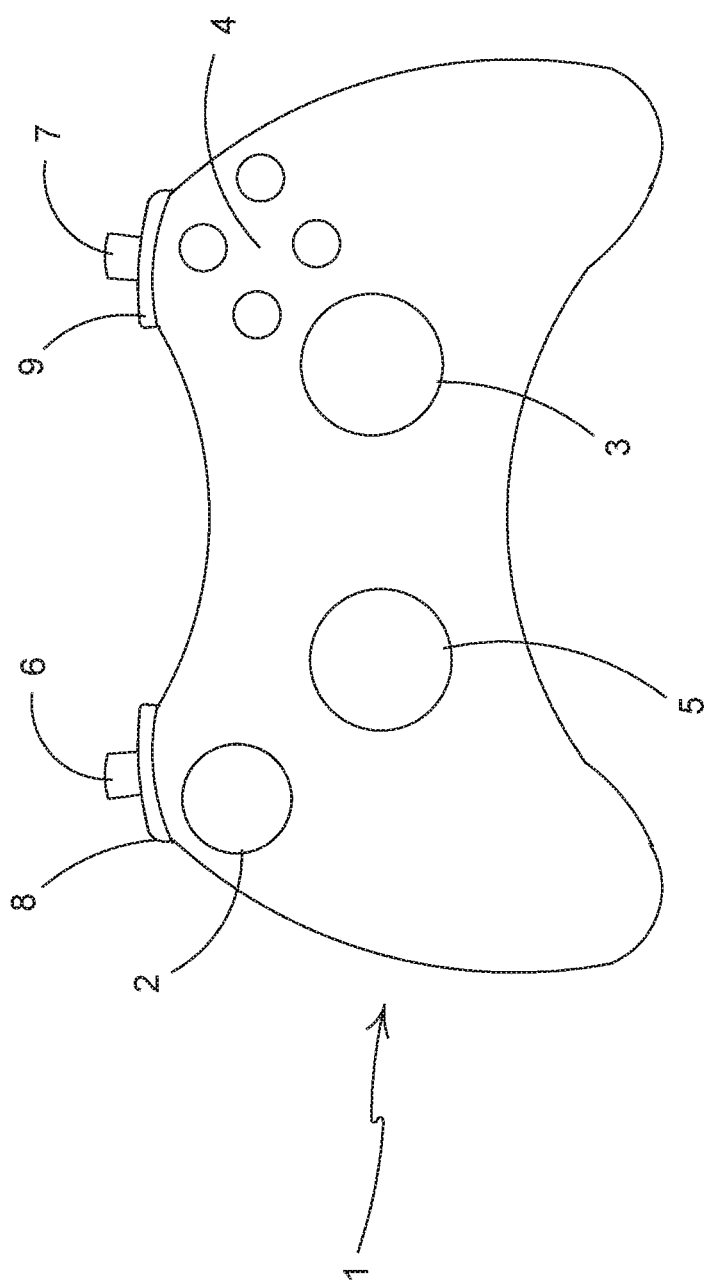
FIG. 1 is a plan view of a controller for a games console.

Referring to FIG. 1 there is shown a controller 1 according to an embodiment of the invention. The controller 1 comprises a mechanism for adjusting trigger travel motion; both the start position and end position of the trigger movement are adjusted by the mechanism.

The controller 1 comprises controls that are mounted on the front and top of the controller 1. The controller 1 comprises a left analogue thumb stick 2 and a right analogue thumb stick 3. The left analogue thumb stick 2 and the right analogue thumb stick 3 normally control movement actions and are intended to be operated by the user's left and right thumbs respectively. The controller 1 comprises four buttons 4, located on a front-right portion of the controller 1, which normally control additional actions and are intended to be operated by the user's right thumb. The controller 1 comprises a direction pad 5 located on the lower portion of the front-left of the controller 1. The direction pad 5 is intended to be operated by the user's left thumb, typically either as an alternative to the left thumb stick 2 or to provide additional actions. The controller 1 also comprises a left trigger 6, a right trigger 7, a left bumper 8 and a right bumper 9 located on the front edge of the controller 1. The left and right triggers 6, 7 are typically operated by a user's index or fore fingers. The left and right bumpers 8, 9 may also be operated by a user's index or fore fingers.

Figure 2:
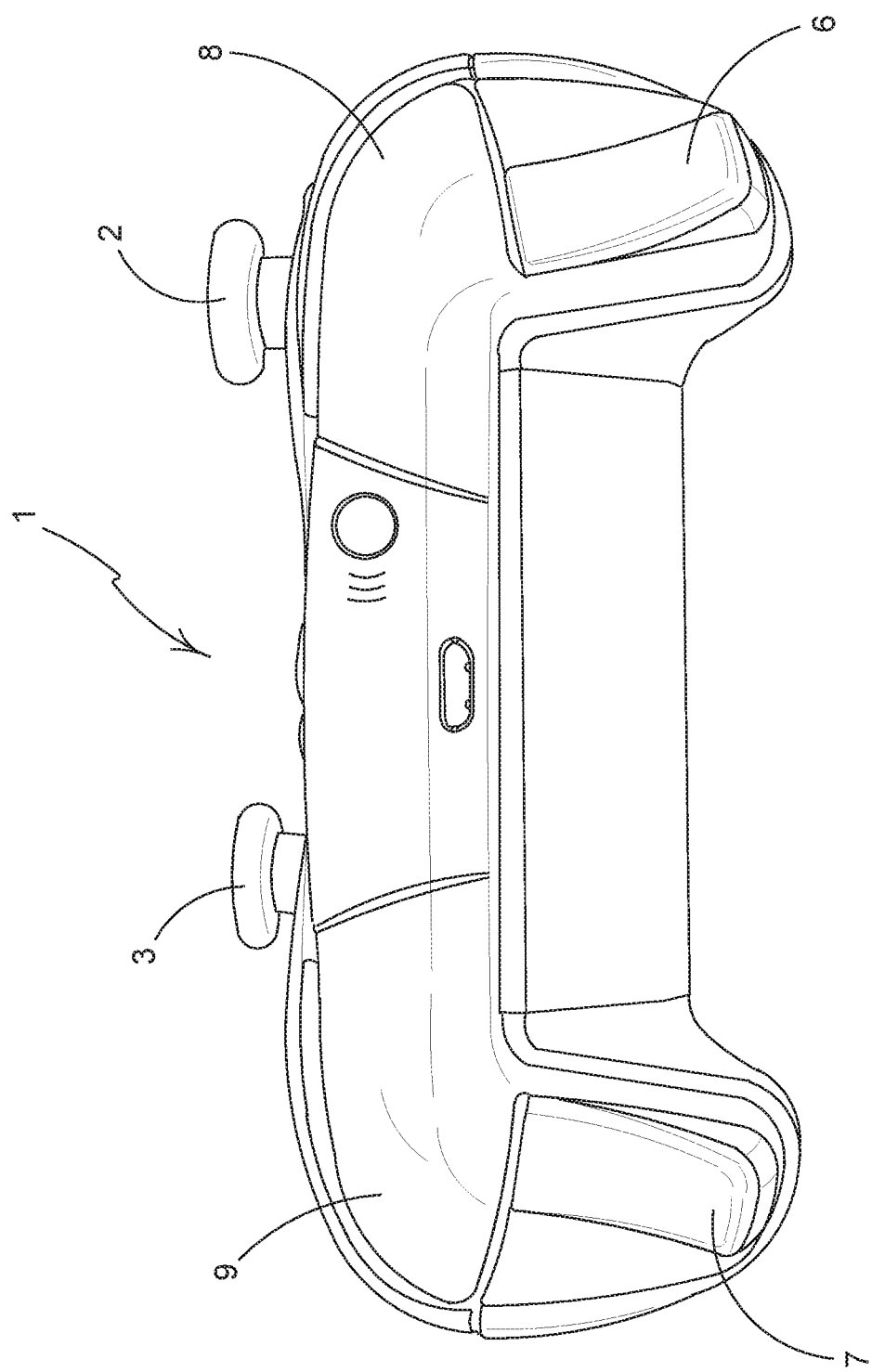
FIG. 2 is a front view of the controller of FIG. 1.

FIG. 2 illustrates a front view of the controller of FIG. 1. It can be seen that the left trigger 6 is mounted below the left bumper 8 and the right trigger 7 is mounted below the right bumper 9.

Figure 3:
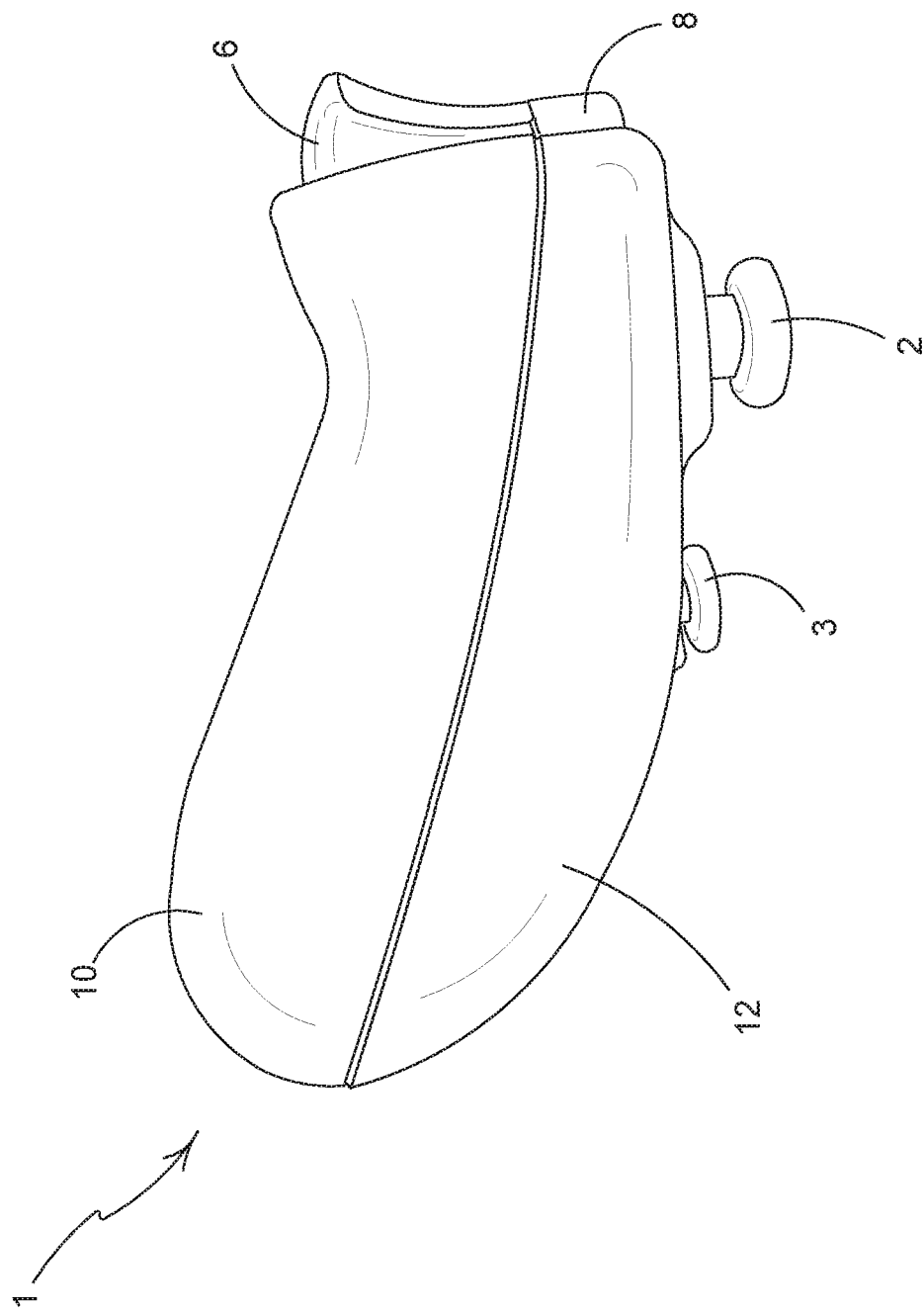
FIG. 3 is a side view of a controller of FIG. 1.
Figure 4:
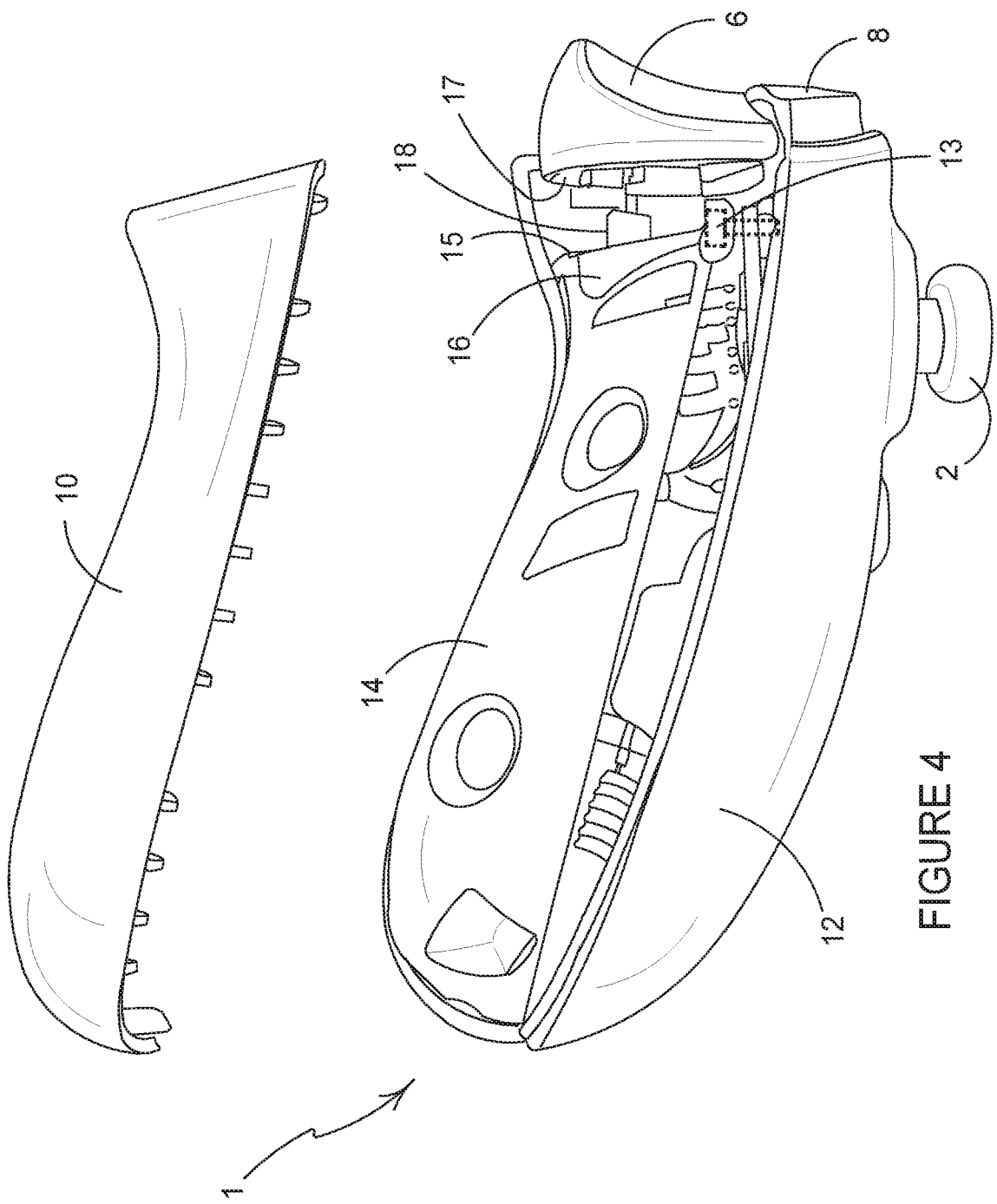
FIG. 4 is an exploded side view of the controller of FIG. 1 showing a removable cover portion.
Figure 5:
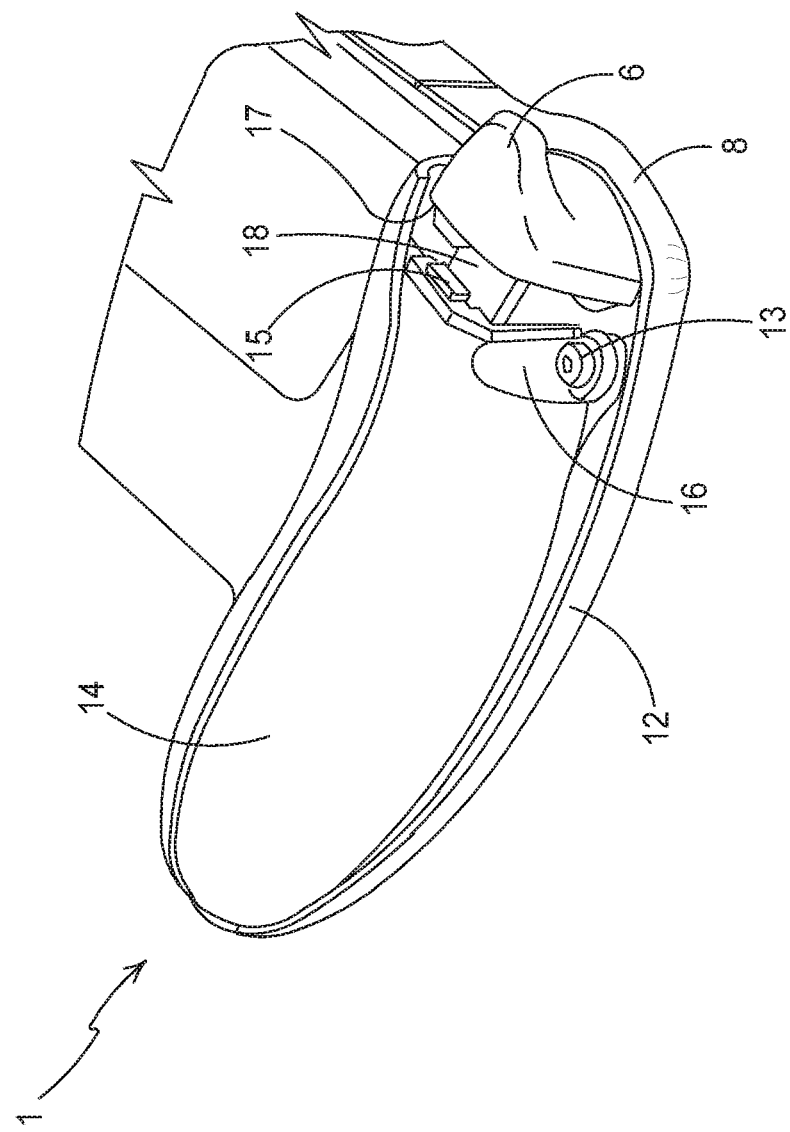
FIG. 5 is a perspective view from below of a portion of the controller of FIG. 1 in which the removable cover portion has been removed to expose the trigger mechanism.

Referring now to FIGS. 3, 4 and 5 the controller 1 comprises a removable cover portion 10 which is detachably coupled to a base chassis member 14. The base chassis member 14 is coupled to a top panel 12.

The base chassis member 14 and the top panel 12 define a void V in which a printed circuit board (not shown) is located. The printed circuit board comprises control electronics (not shown) to which the controls 2, 3, 4, 5, 6, 7, 8, 9 of the controller 1 are coupled. An inner chassis member (not shown) is provided in the void; the printed circuit board is fixed to the inner chassis member.

The base chassis member 14 comprises a cutaway or recess 16 (see FIG. 4) disposed at a front edge thereof. The recess 16 is adjacent to, or facing at least in part, a rear edge 17 of the left trigger 6. A fixing device 13. in the form of a screw, is disposed in the recess 16 and secures the base chassis member 14 to the top panel 12. Preferably, the printed circuit board and the inner chassis member are disposed between the base chassis member 14 and the top panel 12 and are secured in position by the fixing device 13. The fixing device 13 passes through an aperture or cutaway provided in the recess 16, through apertures in each of the printed circuit board and the inner chassis member, and into a concealed bore defined within the top panel 12 (that is to say, the bore does not pass through the top panel 12).

Figure 6:
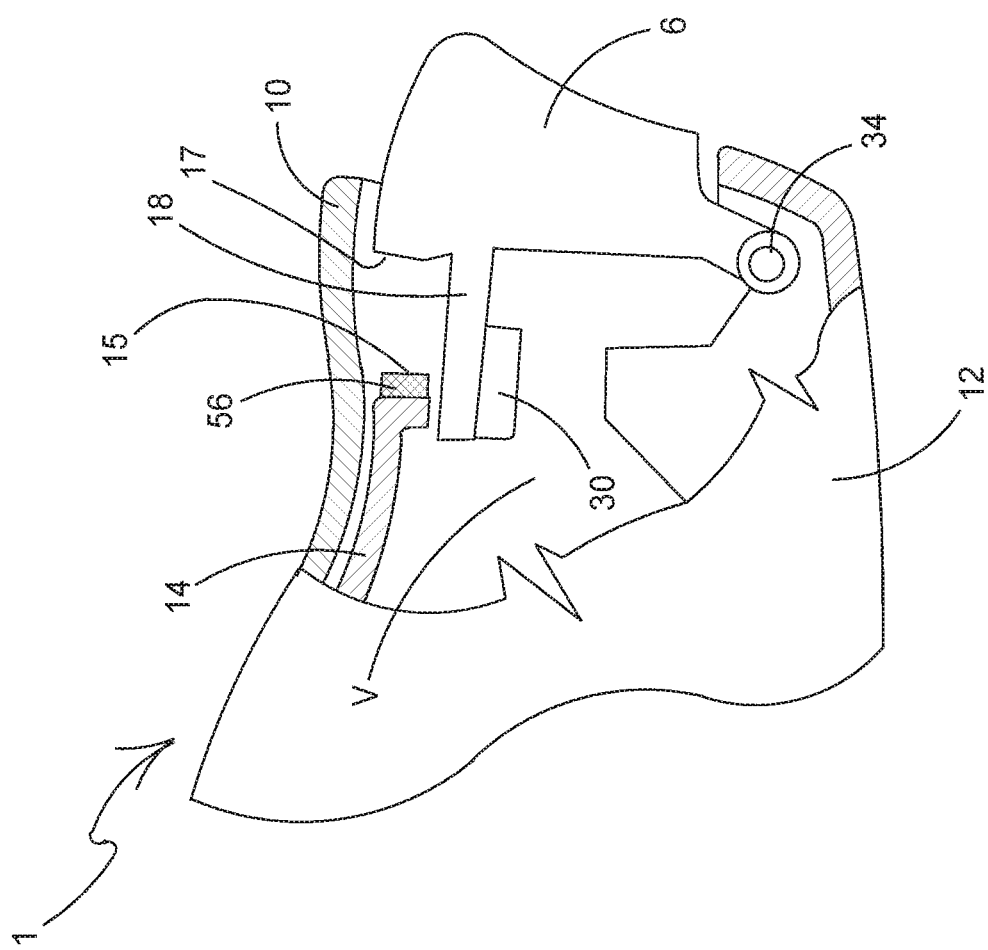
FIG. 6 is a cross sectional view of the trigger mechanism of FIG. 5.

A limb 18 extends from the rear of the left trigger 6 into the void V between the base chassis member 14 and the top panel 12. The limb 18 comprises a magnet 30 (see FIG. 6) attached thereto. The controller 1 determines or senses the position of the magnet 30 relative to a sensor (not shown) provided on the printed circuit board (or in the void) to determine the position or orientation, or to sense movement of, the left trigger body 6.

A front edge 15 of the base chassis member 14 defines an end stop limiting the movement of the left trigger 6. The front edge 15 of the base chassis member 14 may comprise a cushion member 60 to soften the impact of the left trigger body 6 at the end stop. The left trigger 6 is pivotally or rotationally mounted to the inner chassis member or, in alternative embodiments, to the top panel 12. The left trigger 6 is resiliently biased to return to a start position.

Figure 7:
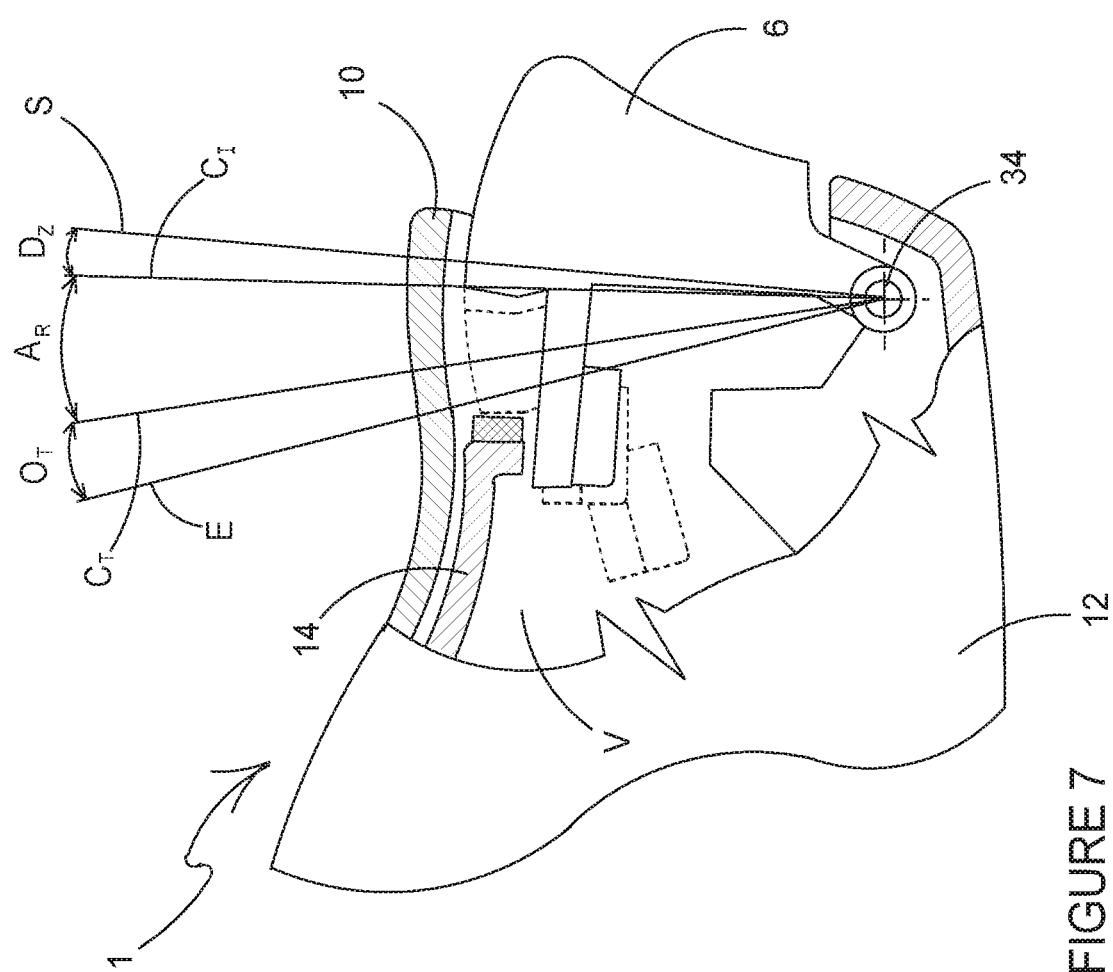
FIG. 7 is a cross sectional view of the trigger mechanism of FIG. 5 showing the range of motion of the trigger mechanism in an exemplary implementation of the use of the range of motion.
Figure 8:
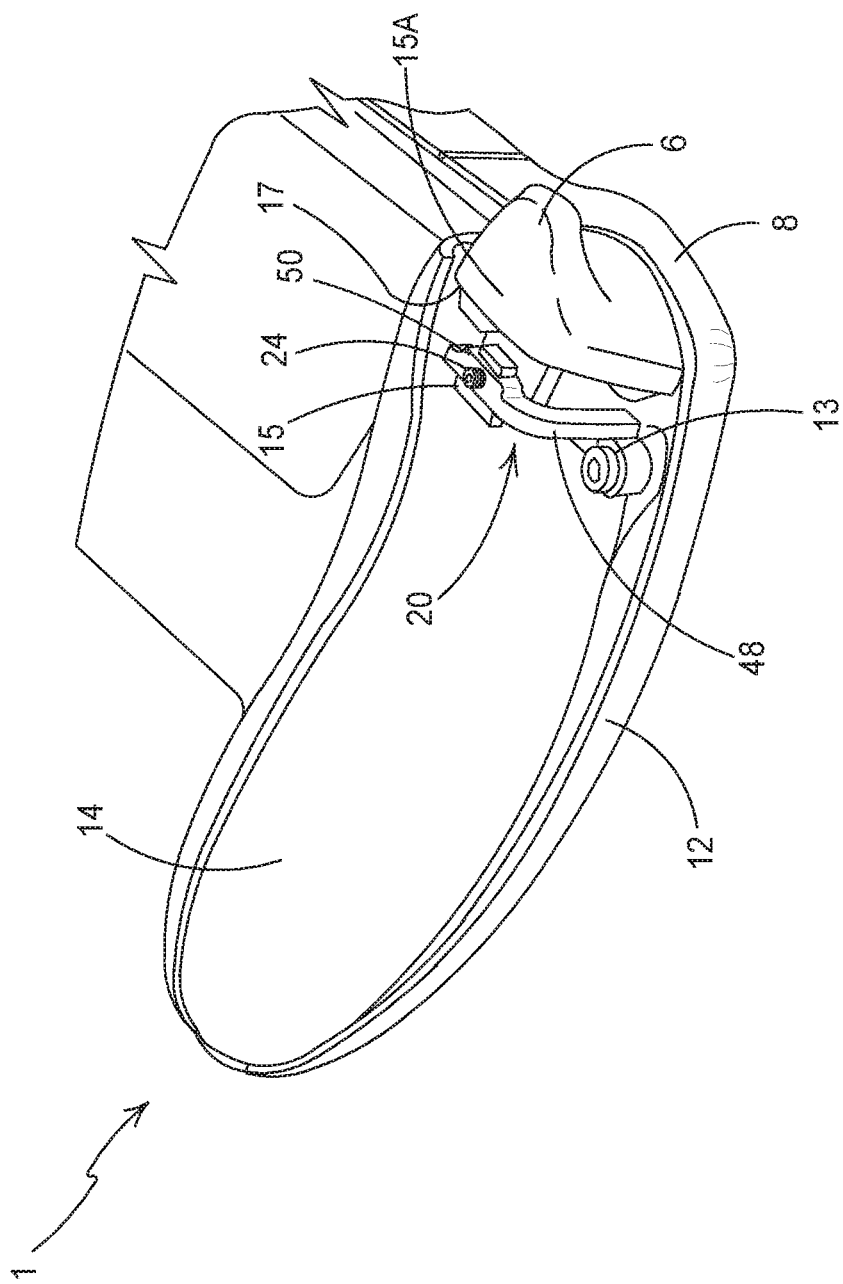
FIG. 8 is a perspective view from below of a portion of the controller of FIG. 1 in which the removable cover portion has been removed to expose a trigger adjustment mechanism according to an embodiment of the invention.
Figure 9B:
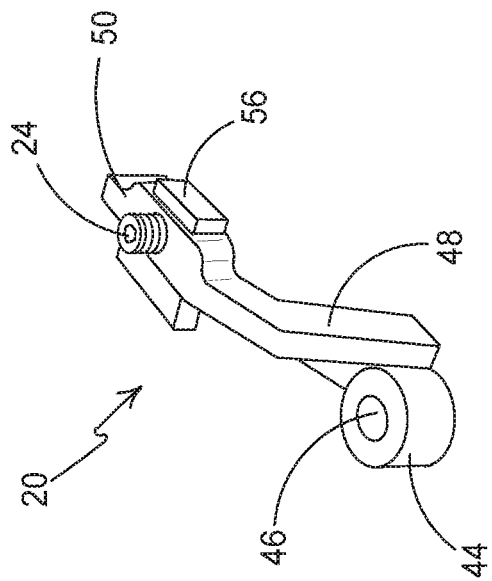
FIG. 9B is a perspective view of the mechanism for adjusting trigger travel motion.
Figure 9A:
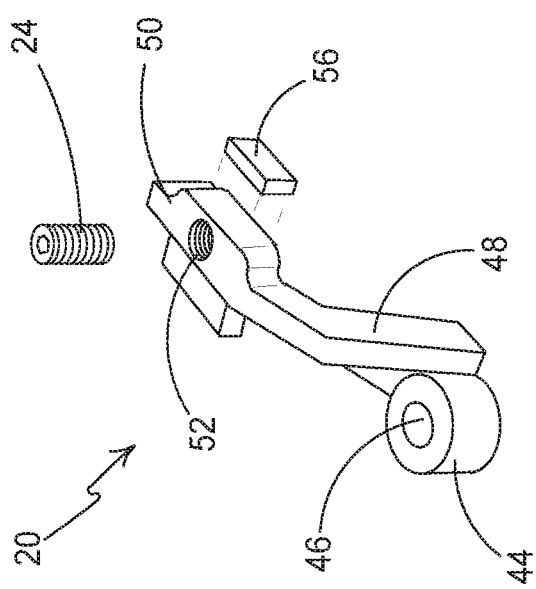
FIG. 9A is an exploded perspective view of the mechanism for adjusting trigger travel motion.

FIG. 7 illustrates a typical use of the range of motion of the trigger mechanism in a gaming application such as a combat style game. The trigger body 6 has a start position S. The trigger body 6 must be moved through a first zone $D_z$, a dead zone in which no commands are initiated. Once the trigger body 6 reaches the position $C_1$ a command action is initiated. The trigger body 6 then moves through an active region $A_R$ in which the command actions are carried out. Once the trigger body reaches the position $C_T$. no further commands are initiated. The trigger body 6 then enters an over-travel zone $O_r$ in which no commands are initiated until the trigger body 6 reaches the end stop E at which point the movement of the trigger body 6 is arrested by the front edge 15 of the base chassis member 14.

Referring now to FIGS. 8 to 11 there is shown a trigger adjustment system 20 that has a mechanism to allow the end user to control or recalibrate the range of motion of the trigger body of the left trigger 6. It will be appreciated that the trigger body of the right trigger 7 can be controlled or recalibrated by employing a system substantially similar to that described in relation to the left trigger mechanism 6, albeit a mirror image thereof.

The trigger adjustment system 20 comprises a base plate 44 in which a bore or aperture 46 is defined. The aperture 46 is configured to receive a fixing device 13 in the form of a screw or bolt. The trigger adjustment system 20 comprises a side wall or riser 48. The riser 48 and the base plate 44 are configured to be received in the recess 16 defined in the base chassis member 14. The trigger adjustment system 20 comprises an arm 50 which extends from the riser 48; preferably the arm 50 extends from an upper end of the riser 48.

The arm 50 is arranged such that it extends between the rear edge 17 of the left trigger body 6 and the front edge 15 of the base chassis member 14.

The arm 50 comprises an aperture 52 which defines a bore. Optionally, the bore comprises an internal screw thread for receiving a control screw 24, also referred to as a trigger adjustment control screw. In some embodiments, control screw 24 takes the form of a grub screw, in the other embodiments the control screw 24 comprises a head preventing the entire control screw 24 from passing through the arm 50.

As shown in FIG. 10, the control screw 24 adjusts the start position of the trigger body 6 as indicated by direction narrow D1. The control screw 24 can be rotated to adjust the extent to which the control screw 24 passes through the arm 50. The lower end of the control screw 24 is brought into contact with the upper surface of the limb 18. As the control screw 24 is tightened into the aperture 52 the left trigger 6 is pivoted about the pivot point 34 and is prevented from returning to the start position shown in FIG. 6.

The arm 50 comprises a front edge 15A which provides an end stop for the range of motion of the left trigger 6. FIG. 10 illustrates the trigger body 6 in a first position; the first position is an initial start position in which the trigger body 6 is in an undepressed state. The left trigger 6 is resiliently biased by a bias mechanism such as a spring to return to the first position. The front edge 15A is disposed closer to the rear edge 17 of the left trigger 6 than the front edge 15 of the base chassis member 14. In this way the range of motion of the trigger body 6 is reduced or shortened. In this way the trigger adjustment system 20 adjusts the extent to which the left trigger 6 can be depressed by a user. Hence, the degree of rotation of the left trigger 6 about the pivot point 34 is restricted or reduced.

Figure 11:
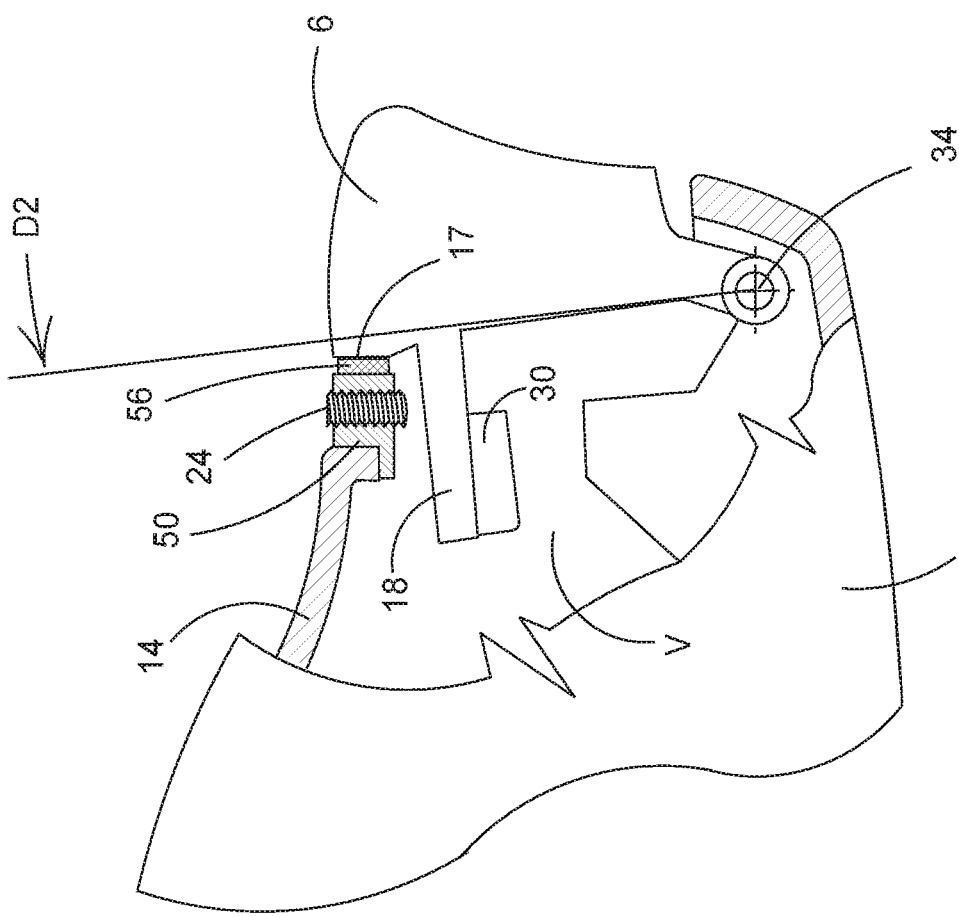
FIG. 11 is a cross sectional view of the trigger mechanism of FIG. 5 including the mechanism for adjusting trigger travel motion wherein the trigger body is illustrated in a second position.

FIG. 11 illustrates the trigger body 6 in a second position; the second position is a terminal position in which the trigger body 6 is in a depressed state. The motion, indicated by direction arrow D2, of the trigger body 6 has been arrested or ceased by the front edge 15A of the arm 50. Optionally, the arm 50 comprises a cushion member 56 for softening the impact between the trigger body 6 and the trigger adjustment system 20.

In this embodiment the thread for receiving the control screw 24 is cut into the arm 50 of the trigger adjustment system 20. In other embodiments it would be possible to use a threaded insert in the arm 50.

Preferably, the position of the left trigger 6 would be adjusted by use of a specified tool that would be provided to turn the control screws 24.

One advantage of the present invention is that it allows adjustments to be made to the trigger response; such adjustment could be customised to suit the nature of the video game that is in use at the time of operation and/or the skill of the operator. For example, in combat style games involving a shooting function it is often the case that the trigger needs to be depressed by a certain amount before any command is prompted. The control screw 24 can be adjusted so that the command is prompted within a desired amount of depression of the trigger body 6. This adjustment can be made by using the required tool (for example an Allen key, or hex or star driver, cross head or flat head screwdriver, spanner or wrench) to turn the control screw 24 thereby driving it into or out of the arm 50 by virtue of the threaded insert or screw thread located therewithin.

After reaching or passing the command initiation point $C_1$ no further commands are initiated by further movement of the trigger body 6. The width of the arm 50 controls the degree of trigger body depression beyond the command initiation point $C_1$. The arm 50 restricts the amount of travel available to the trigger body 6. The arm 50 impedes the movement of the trigger body 6, since the rear edge 17 of the trigger body 6 strikes the front edge 15A of the arm 50 or cushion member 56 when present.

Such an adjustment to the range of motion of the trigger body 6 would directly relate to the majority of combat style games or other varieties of firing operations in video games.

The present invention could find application in a variety of other video game genres but for the simplicity of this disclosure reference is made to combat style games.

A further advantage of the present invention is that it minimises the amount of motion an operator's finger must travel, therefore minimising the recovery time after a trigger initiation command has been made, allowing the operator to commence the command prompt again and again more rapidly, or to operate different commands quicker. As the movement that is required to operate commands by depressing the trigger body is reduced, the risks of any related repetitive strain injury acquired due to the repeated movement of the finger when operating the trigger function may be greatly reduced.

Figure 12:
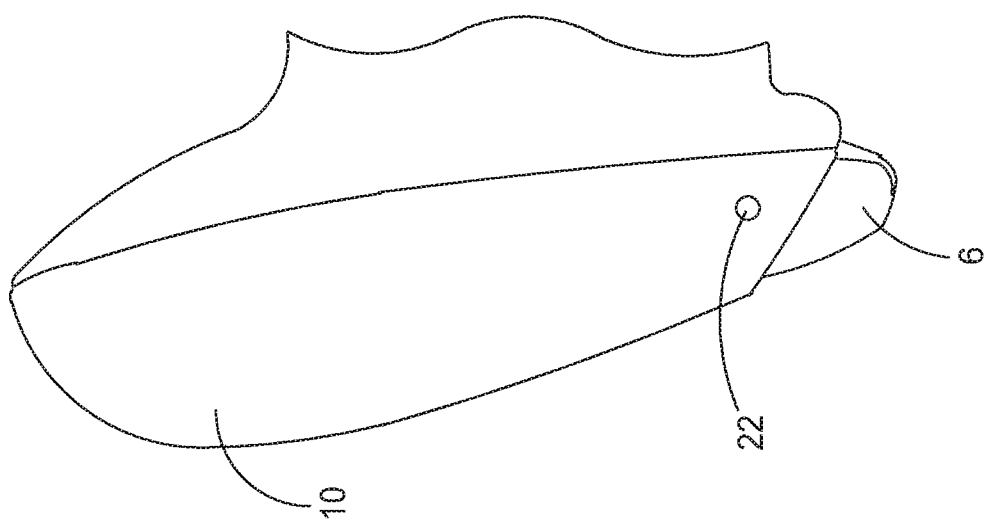
FIG. 12 is a bottom view of a portion of the controller of FIG. 5 including the removable cover portion.

In one embodiment, as illustrated in FIG. 12, the cover portion 10 comprises an access device in the form of an aperture 22 or through hole which passes through the cover portion.

The aperture 22 is configured such that it aligns with the control screw 24. In this way the operator can insert a tool through the aperture 22 and engage the control screw 24 to adjust the range of movement of the trigger body without the need to remove the cover portion 10. In other embodiments the cover portion 10 clips onto the base chassis member 14 by mechanical clips integrally formed therewith, the clips having a barb at one end to engage with a receiver. The cover portion 10 may be detached to adjust the control screw 24 or to remove trigger adjustment system 20 to restore the full range of motion of the trigger body 6.

It will be recognized that as used herein, directional references such as "top", "bottom", "front", "back", "end", "side", "inner", "outer", "upper" and "lower" do not necessarily limit the respective features to such orientation, but may merely serve to distinguish these features from one another.

While particular embodiments of the invention have been shown and described, numerous variations and alternative embodiments will occur to those skilled in the art without departing from the scope of the present invention.

The invention claimed is:

1. An apparatus for providing a user input to a computer program for controlling the computer program, the apparatus comprising:
    an outer case;
    at least one depressible trigger pivotally mounted to the apparatus and biased to a resting position when the depressible trigger is not activated, the depressible trigger having an outer surface configured for engagement during operation and extending outside the outer case, and an inner surface opposite the outer surface, wherein the inner surface defines a travel path in response to an activation of the depressible trigger; and
    a mechanism extending from a plane different from the plane of the travel path into a void behind the inner surface of the depressible trigger, wherein the void is defined by the outer case, the mechanism configured to adjust a length of the travel path of the depressible trigger.

2. The apparatus of claim 1, wherein the mechanism is manually adjustable by a user to adjust a range of motion of the depressible trigger from a first range of motion to a second range of motion.

3. The apparatus of claim 2, wherein the mechanism is manually adjustable via an aperture in the outer case.

4. The apparatus of claim 2, wherein the range of motion of the depressible trigger is manually adjustable via an engagement device coupled to the mechanism.

5. The apparatus of claim 4, wherein the engagement device is coupled to the mechanism through an aperture in the outer case such that the mechanism may be activated from outside the outer case.

6. The apparatus of claim 2, wherein adjustment of the range of motion of the depressible trigger comprises adjustment of an ending position of the depressible trigger after depression by a user.

7. The apparatus of claim 1, wherein the computer program is a game program.

8. The apparatus of claim 7, wherein the mechanism is configured to provide a first range of motion for the depressible trigger associated with a first game program, and a second range of motion for the depressible trigger associated with a second game program.

9. The apparatus of claim 1, wherein the apparatus comprises a game controller configured to operate with a computing device.

10. The apparatus of claim 9, wherein the computing device comprises a video gaming console.

11. The apparatus of claim 9, further comprising:
    a second depressible trigger pivotally mounted to the apparatus and biased to a second resting position when the second depressible trigger is not activated, the second depressible trigger having an outer surface configured for engagement during operation and extending outside the outer case, and an inner surface opposite the outer surface, wherein the inner surface defines a second travel path in response to an activation of the second depressible trigger; and
    a second mechanism extending from a plane different from the plane of the second travel path into a second void behind the inner surface of the second depressible trigger, wherein the second void is defined by the outer case, the second mechanism configured to adjust a length of the second travel path of the second depressible trigger.

12. A trigger stop for use in an apparatus for supplying user inputs to a computer program for controlling the computer program, the trigger stop comprising:
    a stop mechanism configured to adjust a range of motion of a depressible trigger of the apparatus,
    wherein the depressible trigger comprises:
        a first surface located outside an outer case of the apparatus, the first surface configured to provide an engagement surface for a user to activate the depressible trigger, and
        a second surface opposite the first surface, the second surface configured to define a pathway in a volume defined by the outer case when the trigger is activated, wherein the stop mechanism is disposed within the volume defined by the outer case of the apparatus, and wherein the stop mechanism extends into the pathway of the second surface along plane different from the plane of the pathway to adjust the range of motion of the depressible trigger.

13. The trigger stop of claim 12, wherein a position of the trigger stop is manually adjustable by the trigger stop to define at least a first and second range of motion of the depressible trigger.

14. The trigger stop of claim 12, wherein the computer program is a game program.

15. The trigger stop of claim 12, wherein the apparatus comprises a game controller configured to operate with a computing device.

16. The trigger stop of claim 15, wherein the computing device comprises a game console.

17. A game controller for controlling an electronic game, the game controller comprising:

a housing;

a pivoting trigger at least partially disposed within the housing, the trigger comprising a first surface configured to be engaged by a user to depress the trigger and a second surface opposite the first surface, the second surface defining a pathway when the trigger is depressed;

electrical circuitry contained within the housing, wherein the trigger is in operational association with the electrical circuitry such that depression of the trigger causes electrical outputs of the electrical circuitry to control operation of the electronic game; and a trigger stop disposed within the housing in the pathway of the second surface of the trigger, the trigger stop disposed along plane different from the plane of the pathway, the trigger stop configured to change a range of depressible motion of the trigger.

18. The game controller of claim 17, wherein the trigger stop is manually adjustable by a user to adjust the depressible range of motion of the trigger from a first range of motion to a second range of motion.

19. The game controller of claim 18, wherein the trigger stop is manually adjustable via an aperture in the housing.

20. The game controller of claim 18, wherein the trigger stop comprises an engagement device configured to be manipulated to cause the trigger stop to adjust the range of depressible motion of the trigger from the first range of motion to the second range of motion.

* * * * *